(12) United States Patent
Zhang

(10) Patent No.: US 9,083,629 B2
(45) Date of Patent: Jul. 14, 2015

(54) METHOD AND EDGING DEVICE FOR CREATING FORWARDING TABLE, FORWARDING MESSAGE AND OBTAINING ADDRESS

(71) Applicant: Huawei Technologies Co., Ltd., Shenzhen (CN)

(72) Inventor: Yuyang Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 211 days.

(21) Appl. No.: 13/838,495

(22) Filed: Mar. 15, 2013

(65) Prior Publication Data

US 2013/0201827 A1  Aug. 8, 2013

Related U.S. Application Data

(63) Continuation of application No. PCT/CN2011/075271, filed on Jun. 3, 2011.

(30) Foreign Application Priority Data

Sep. 17, 2010 (CN) .......................... 2010 1 0289848

(51) Int. Cl.
  *H04L 12/46* (2006.01)
  *H04L 12/803* (2013.01)
  (Continued)

(52) U.S. Cl.
  CPC .............. *H04L 47/125* (2013.01); *H04L 45/24* (2013.01); *H04L 47/726* (2013.01)

(58) Field of Classification Search
  CPC ... H04L 47/125; H04L 47/726; H04L 12/462; H04L 45/24
  See application file for complete search history.

(56) References Cited

U.S. PATENT DOCUMENTS 7,697,534 B1* 4/2010 Narayanan et al. ........... 370/392
2008/0225695 A1* 9/2008 Balus et al. ................... 370/216
(Continued)

FOREIGN PATENT DOCUMENTS

CN 101110746 A 1/2008
CN 101483638 A 7/2009
(Continued)

OTHER PUBLICATIONS

Extended European Search Report issued in corresponding European Patent Application No. 11786123.7, mailed Jul. 11, 2013, 8 pages.
(Continued)

*Primary Examiner* — Paul H Masur
(74) *Attorney, Agent, or Firm* — Brinks Gilson & Lione

(57) ABSTRACT

The present invention provides a method and a network provider edge (NPE) for creating the forwarding table, forwarding the message and obtaining the address; the method for creating the forwarding table includes: the network provider edge (NPE) receives the label distribution protocol (LDP) message which carries the backbone media access control (MAC) address of the destination user facing-provider edge (UPE) and the load sharing negotiation parameter between the destination UPE and the NPE; the NPE obtains multiple extend MAC addresses of the destination UPE according to the LDP message; the forwarding table is created for each extend MAC address respectively, and the forwarding table includes the extend MAC address and the corresponding multiple output ports.

22 Claims, 8 Drawing Sheets

(51) Int. Cl.
*H04L 12/707* (2013.01)
*H04L 12/911* (2013.01)

(56) References Cited

U.S. PATENT DOCUMENTS

| | | | |
|---|---|---|---|
| 2008/0228943 A1* | 9/2008 | Balus et al. | 709/239 |
| 2009/0201937 A1* | 8/2009 | Bragg et al. | 370/401 |
| 2010/0128728 A1* | 5/2010 | Sun et al. | 370/392 |
| 2010/0208593 A1 | 8/2010 | Soon et al. | |
| 2010/0208615 A1 | 8/2010 | Soon et al. | |
| 2010/0287405 A1* | 11/2010 | Soon | 714/4 |
| 2012/0287818 A1* | 11/2012 | Corti et al. | 370/254 |

FOREIGN PATENT DOCUMENTS

| | | |
|---|---|---|
| CN | 101521631 A | 9/2009 |
| CN | 101820397 A | 9/2010 |
| EP | 1858212 A1 | 11/2007 |

OTHER PUBLICATIONS

Balus et al., "VPLS Extensions for Provider Backbone Bridging" L2VPN Working Group, Jul. 14, 2008, 25 pages.

Sajassi et al., "VPLS Interoperability with Provider Backbone Bridges" L2VPN Working Group, Jan. 5, 2010, 23 pages.

Written Opinion of the International Searching Authority issued in corresponding PCT Patent Application No. PCT/CN2011/075271, mailed Sep. 8, 2011.

International Search Report issued in corresponding PCT Patent Application No. PCT/CN2011/075271, mailed Sep. 8, 2011.

LAN/MAN Standards Committee, "Virtual Bridged Local Area Networks—Amendment 7: Provider Backbone Bridges" IEEE Standards for Local and Metropolitan Area Networks. IEEE Std 802.1ah™—2008.

Balus et al., "Extensions to LDP MAC Withdraw for PBB-VPLS" L2VPN Working Group, Mar. 8, 2010.

\* cited by examiner

METHOD AND EDGING DEVICE FOR CREATING FORWARDING TABLE, FORWARDING MESSAGE AND OBTAINING ADDRESS

CROSS-REFERENCE TO RELATED APPLICATIONS

This application is a continuation of International Application No. PCT/CN2011/075271, filed Jun. 3, 2011, which claims priority to Chinese Patent Application No. 201010289848.2, filed Sep. 17, 2010, both of which are hereby incorporated by reference in their entireties.

TECHNICAL FIELD

The present invention relates to the field of communications, and more particularly to a method and an edging device for creating forwarding tables, forwarding messages and obtaining addresses.

BACKGROUND ART

Also referred to as Mac-in-Mac, the provider backbone bridge (PBB) technology is defined by the IEEE 802. 1ah draft standard, and achieves complete separation of the user network from the provider network by packaging user media access control (MAC) to the common network MAC for transmission.

In order to solve the problem of network expansibility, PBB can be used by combining with the technology of hierarchical virtual private local area network services (H-VPLS). By forwarding virtue of PBB+H-VPLS, it suffices for the user facing provider edge (UPE) to acquire the MAC addresses of local users and users at the opposite end and the MAC address of the common network in the virtual switch instance (VSI), and it suffices for the network provider edge (NPE) to acquire the MAC address of the common network in the VSI, thereby greatly reducing the number of MAC tables of the network provider edge NPE, so that expansion of network specifications is no longer restricted.

In the PBB H-VPLS network, deployed on the user facing provider edge UPE can be a backbone component (B-Component) that provides bridging function based on backbone MAC (B-MAC) address and backbone tag (B-TAG) information. A service instance component (I-Component) that provides bridging function based on user MAC address and source virtual local area network (S-LAN) information can also be deployed on the B-Component.

Currently, in order to achieve the objective of sharing load in the PBB H-VPLS network, the UPE is configured with different backbone source MACs (B-SMACs) under the service I-Component, and the NPE performs Hash routing based on the service I-Component through the different B-SMACs.

However, as the inventor found during the process of implementing the present invention, the prior art technology is defective in the fact that, since each B-Component can have great quantities of service I-Components, the UPE should be equipped with a mass of B-SMACs, and the NPE should also create a mass of forwarding tables, thus bringing undue load to the edging device.

SUMMARY OF THE INVENTION

Embodiments of the present invention provide methods and edging devices for creating forwarding tables, for forwarding messages and for obtaining addresses. By creating the forwarding table according to the load sharing negotiation parameter and the backbone MAC address, the forwarding tables of the network provider edge (NPE) can be greatly reduced and the pressure of the edging device can be lightened.

In order to achieve the above objectives, embodiments of the present invention provide a method for creating a forwarding table, applied in a PBB over H-VPLS network. The method includes: receiving, by a network provider edge NPE, a label distribution protocol LDP message, the LDP message carrying a backbone MAC address of the destination UPE and a load sharing negotiation parameter between the destination UPE and the NPE or the LDP message carrying an extended MAC address created according to the backbone MAC address and the load sharing negotiation parameter; obtaining, by the NPE, multiple extended MAC addresses of the destination UPE according to the LDP message; and creating a forwarding table for each extended MAC address, the forwarding table including the extended MAC address and multiple corresponding output ports.

Embodiments of the present invention further provide a method for forwarding a message, applied in a PBB over H-VPLS network. The method includes: obtaining, by a destination UPE, a load sharing negotiation parameter; adding into a label distribution protocol (LDP) message the load sharing negotiation parameter and a backbone MAC address of the destination UPE; or adding into the LDP message an extended MAC address created according to the backbone MAC address and the load sharing negotiation parameter; and forwarding the processed label distribution protocol message.

Embodiments of the present invention further provide a method for obtaining an address, applied in a PBB over H-VPLS network. The method includes: obtaining, by a source UPE, a load sharing negotiation parameter and a backbone media access control (MAC) address of the destination UPE, the load sharing negotiation parameter including the number of load sharing links in the PBB over H-VPLS network; and obtaining, by the source UPE, multiple extended MAC addresses of the destination UPE according to the load sharing negotiation parameter and the backbone MAC address of the destination UPE.

Embodiments of the present invention further provide a network provider edge (NPE), applied in a PBB over H-VPLS network. The NPE includes: a first receiving unit configured to receive a label distribution protocol (LDP) message, the LDP message carrying a backbone media access control (MAC) address of the destination UPE and a load sharing negotiation parameter between the destination UPE and the NPE or the LDP message carrying an extended MAC address created according to the backbone MAC address and the load sharing negotiation parameter; a first obtaining unit configured to obtain multiple extended MAC addresses of the destination UPE according to the LDP message; and a table creating unit configured to create a forwarding table for each extended MAC address, the forwarding table including the extended MAC address and multiple corresponding output ports.

Embodiments of the present invention further provide a destination user facing-provider edge (UPE), applied in a PBB over H-VPLS network. The UPE includes: a second obtaining unit configured to obtain a load sharing negotiation parameter; an information adding unit configured to add into a label distribution protocol (LDP) message a backbone media access control (MAC) address that includes the load sharing negotiation parameter and the destination UPE, or add into the LDP message an extended MAC address created according to the backbone MAC address and the load sharing negotiation parameter; and a second forwarding unit configured to forward the processed label distribution protocol message.

Embodiments of the present invention further provide a source user facing-provider edge (UPE), applied in a PBB over H-VPLS network. The UPE includes: a third obtaining unit configured to obtain a load sharing negotiation parameter and a backbone media access control (MAC) address of the destination UPE, the load sharing negotiation parameter including the number of load sharing links in the PBB over H-VPLS network; and a fourth obtaining unit configured to obtain multiple extended MAC addresses of the destination UPE according to the load sharing negotiation parameter and the backbone MAC address of the destination UPE.

Advantageous effects of the embodiments of the present invention rest in the fact that, by creating the forwarding table according to the load sharing negotiation parameter and the backbone MAC address, the forwarding tables of the network provider edge (NPE) can be greatly reduced and the pressure of the edging device can be lightened.

BRIEF DESCRIPTION OF THE DRAWINGS

Accompanying drawings as herein described are provided for further comprehension of the invention, constitute a part of the present application, and are not definitive of the invention. In the drawings.

DETAILED DESCRIPTION OF THE INVENTION

To make more apparent and clear the objectives, technical solutions and advantages of the present invention, embodiments of the present invention are described in greater detail below with reference to the accompanying drawings. The exemplary embodiments of the present invention and the explanations thereof are merely meant to explain, rather than to limit, the present invention.

Embodiment 1

An embodiment of the present invention provides a method for creating a forwarding table, applied in a PBB over H-VPLS network, the network includes a source UPE, an NPE and a destination UPE, and there are load sharing links between the NPE and the destination UPE.

Figure 1:
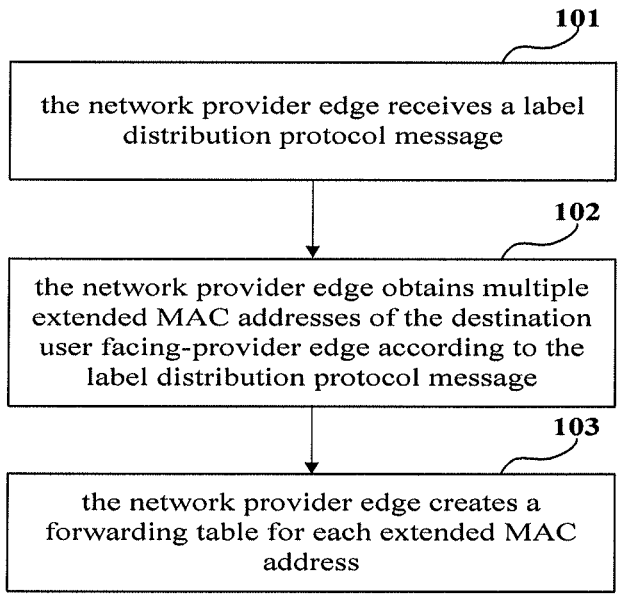
FIG. 1 is a flowchart illustrating the method for creating a forwarding table according to Embodiment 1 of the present invention.

As shown in FIG. 1, the method includes the following steps.

Step 101—the NPE receives a label distribution protocol (LDP) message, the LDP message carrying a backbone MAC address of the destination UPE and a load sharing negotiation parameter between the destination UPE and the NPE or carrying an extended MAC address created according to the backbone MAC address and the load sharing negotiation parameter, in which the LDP message can be transmitted to the NPE via the destination UPE or via any other network device capable of receiving or creating the LDP message.

Step 102—the NPE obtains multiple extended MAC addresses of the destination UPE according to the LDP message.

Step 103—the NPE creates a forwarding table, which includes an extended MAC address and multiple corresponding output ports, for each extended MAC address respectively.

In this embodiment, the label distribution protocol (LDP) message can be transmitted by the UPE in the PBB over H-VPLS network. Preferably, the LDP message can carry a type length value (TLV) that includes the load sharing negotiation parameter and the backbone MAC address. The type length value can be obtained by extending according to a PBB TLV as defined by the International Internet Engineering Task Force (IETF).

In this embodiment, the load sharing negotiation parameter can include the number of load sharing links in the PBB over H-VPLS network, and the number of load sharing links in the PBB over H-VPLS network can be obtained according to a planning parameter of the PBB over H-VPLS network, and can be predetermined. However, not restricted thereto, it is also possible to determine the specific content of the load sharing negotiation parameter according to actual circumstances.

In this embodiment, the NPE can obtain multiple extended MAC addresses of the destination UPE according to the LDP message, and can preferably create multiple continuous extended MAC addresses. For instance, when the number of load sharing links in the PBB over H-VPLS network is 3, it is possible to create three continuous extended MAC addresses 1-1-1, 1-1-2, and 1-1-3. But not restricted thereto, the specific embodiment can be determined according to actual circumstances.

Alternatively, the LDP message can carry an MAC address created according to the backbone MAC address and the load sharing negotiation parameter. It is possible for the destination UPE to create multiple extended MAC addresses according to the backbone MAC address and the load sharing negotiation parameter, and then add the addresses in the LDP message. After receiving the LDP message, the NPE can obtain multiple extended MAC addresses. But not restricted thereto, the specific embodiment can be determined according to actual circumstances.

In this embodiment, the NPE can create a forwarding table for each extended MAC address respectively. Since there are load sharing links between the NPE and the destination UPE, i.e. the NPE includes multiple output ports leading to the destination UPE, each forwarding table can include the extended MAC addresses and multiple corresponding output ports.

Preferably, the NPE receives the LDP message transmitted from the destination UPE via one port, and obtains the extended MAC addresses; thereafter, the NPE determines the entire ports according to a set of ports of the load sharing links maintained by itself; the NPE subsequently creates a forwarding table respectively for each extended MAC address according to the extended MAC addresses and all the ports. Thus, the forwarding table of each extended MAC address corresponds to multiple output ports.

On receiving a data message with the destination address being an extended MAC address after creating the forwarding table, the NPE can forward the data message according to the forwarding table. Since the forwarding table of the extended MAC address corresponds to multiple output ports, the NPE performs load sharing forwarding on a data message with destination addresses being different extended MAC addresses. Preferably, the NPE performs a Hash operation on the extended MAC addresses, and selects an output port for the data message according to the hashing result.

As can be known from the above embodiment, the NPE creates the forwarding table according to the extended MAC addresses, while the number of the extended MAC addresses is determined according to the number of load sharing links between the NPE and the destination UPE. Thus, in comparison with the number of I-tags of the data message, the number of the extended MAC addresses is by far less. Since it is not necessary for the NPE to create the corresponding number of forwarding tables in accordance with the number of I-tags, the number of forwarding tables in the NPE can be greatly reduced, and the pressure of the device is lightened.

Embodiment 2

An embodiment of the present invention provides a method for forwarding a message, applied in a PBB over H-VPLS network, the network includes a source UPE, an NPE and a destination UPE, and there are load sharing links between the NPE and the destination UPE.

Figure 2:
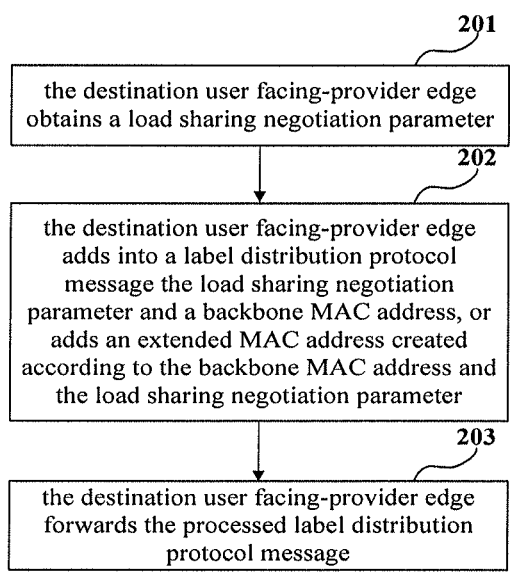
FIG. 2 is a flowchart illustrating the method for forwarding a message according to Embodiment 2 of the present invention.

As shown in FIG. 2, the method includes the following steps.

Step 201—the destination UPE obtains a load sharing negotiation parameter.

Step 202—the destination UPE adds into an LDP message the load sharing negotiation parameter and a backbone MAC address of the destination UPE, or adds into the LDP message an extended MAC address created according to the backbone MAC address and the load sharing negotiation parameter.

Step 203—the destination UPE forwards the processed LDP message.

In this embodiment, the destination UPE can obtain in advance the load sharing negotiation parameter according to a planning parameter of the PBB over H-VPLS network. Preferably, the destination UPE can add into the LDP message a type length value extended from a PBB TLV as defined in accordance with IETF. The type length value includes the load sharing negotiation parameter and the backbone MAC address of the destination UPE, and the load sharing negotiation parameter can include the number of load sharing links in the PBB over H-VPLS network.

Alternatively, the destination UPE can add into the LDP message multiple extended MAC addresses created according to the backbone MAC address and the load sharing negotiation parameter. For instance, when the number of load sharing links in the PBB over H-VPLS network is 3, it is possible to create three extended MAC addresses. But not restricted thereto, the specific embodiment can be determined according to actual circumstances.

In this embodiment, the destination UPE can forward the processed LDP message to the NPE.

As can be known from the above embodiment, by adding the load sharing negotiation parameter and the backbone MAC address in the LDP message or adding in the LDP message the MAC addresses created according to the backbone MAC address and the load sharing negotiation parameter through the destination UPE, it is made possible for the NPE to create the forwarding table according to the LDP message, whereby the forwarding tables of the NPE are greatly reduced, and the pressure of the edging device is lightened.

Embodiment 3

An embodiment of the present invention provides a method for obtaining an address, applied in a PBB over H-VPLS network. The network includes a source UPE, an NPE and a destination UPE, and there are load sharing links between the NPE and the destination UPE.

Figure 3:
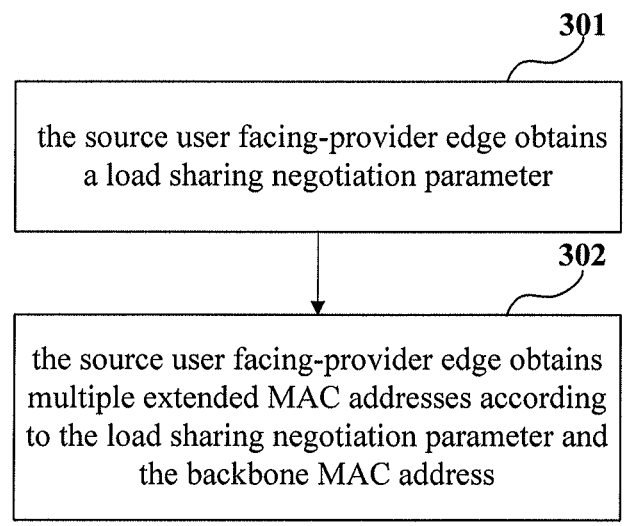
FIG. 3 is a flowchart illustrating the method for obtaining an address according to Embodiment 3 of the present invention.

As shown in FIG. 3, the method includes the following steps.

Step 301—the source UPE obtains a load sharing negotiation parameter and a backbone MAC address of the destination UPE, the load sharing negotiation parameter including the number of load sharing links in the PBB over H-VPLS network.

Step 302—the source UI obtains multiple extended MAC addresses of the destination UPE according to the load sharing negotiation parameter and the backbone MAC address of the destination UPE.

In this embodiment, the source UPE can obtain in advance the load sharing negotiation parameter according to a planning parameter of the PBB over H-VPLS network. Specifically, the source UPE can be statically configured to obtain the load sharing negotiation parameter. The load sharing negotiation parameter can include the number of load sharing links in the PBB over H-VPLS network. But not restricted thereto, the specific content of the load sharing negotiation parameter can be determined according to actual circumstances.

In this embodiment, the source UPE can obtain in advance the backbone MAC address of the destination UPE. Specifically, the backbone MAC address can be obtained through static configuration, and can also be obtained through dynamic learning from the NPE or the destination UPE.

In this embodiment, the source UPE can create multiple extended MAC addresses according to the backbone MAC address of the destination UPE and the load sharing negotiation parameter. For instance, when the number of load sharing links in the PBB over H-VPLS network is 3, it is possible to create three continuous extended MAC addresses. But not restricted thereto, the specific embodiment can be determined according to actual circumstances.

The source UPE assigns the data message with an extended MAC address according to multiple extended MAC addresses of the destination UPE, packages the data message according to the extended MAC address assigned to the data message, and forwards the processed data message.

Preferably, the source UPE divides the received data message into multiple groups based on the number of the extended MAC addresses, and assigns each group of data message with an extended MAC address, in which the extended MAC address of each group of data message is different from the MAC addresses of other groups.

Preferably, the source UPE assigns data messages with the same I-tags to the same group. When the number of I-tags is greater than the number of the extended MAC addresses, a group of data messages includes data messages carrying different I-tags.

Preferably, it is possible to divide data messages carrying different I-tags into groups by a Hash algorithm. Specifically, the source UPE can perform Hash calculation on the instance tags (I-tags) to which the data messages correspond, and determine the extended MAC addresses to which the data messages correspond according to the result of the Hash operation.

As can be known from the above embodiment, the source UPE obtains the extended MAC addresses according to the load sharing negotiation parameter and the backbone MAC address of the destination UPE, and takes the extended MAC addresses as the destination addresses of the data messages. Thus, it suffices for the NPE to merely maintain the forwarding tables to which the extended MAC addresses correspond. Since the number of the extended MAC addresses is relatively few, the forwarding tables of the NPE are greatly reduced, and the pressure of the device is lightened.

Embodiment 4

An embodiment of the present invention provides a method for creating a forwarding table and forwarding a data message, and the process is described in detail and completeness below on the basis of the foregoing Embodiments 1, 2 and 3.

Figure 4A:
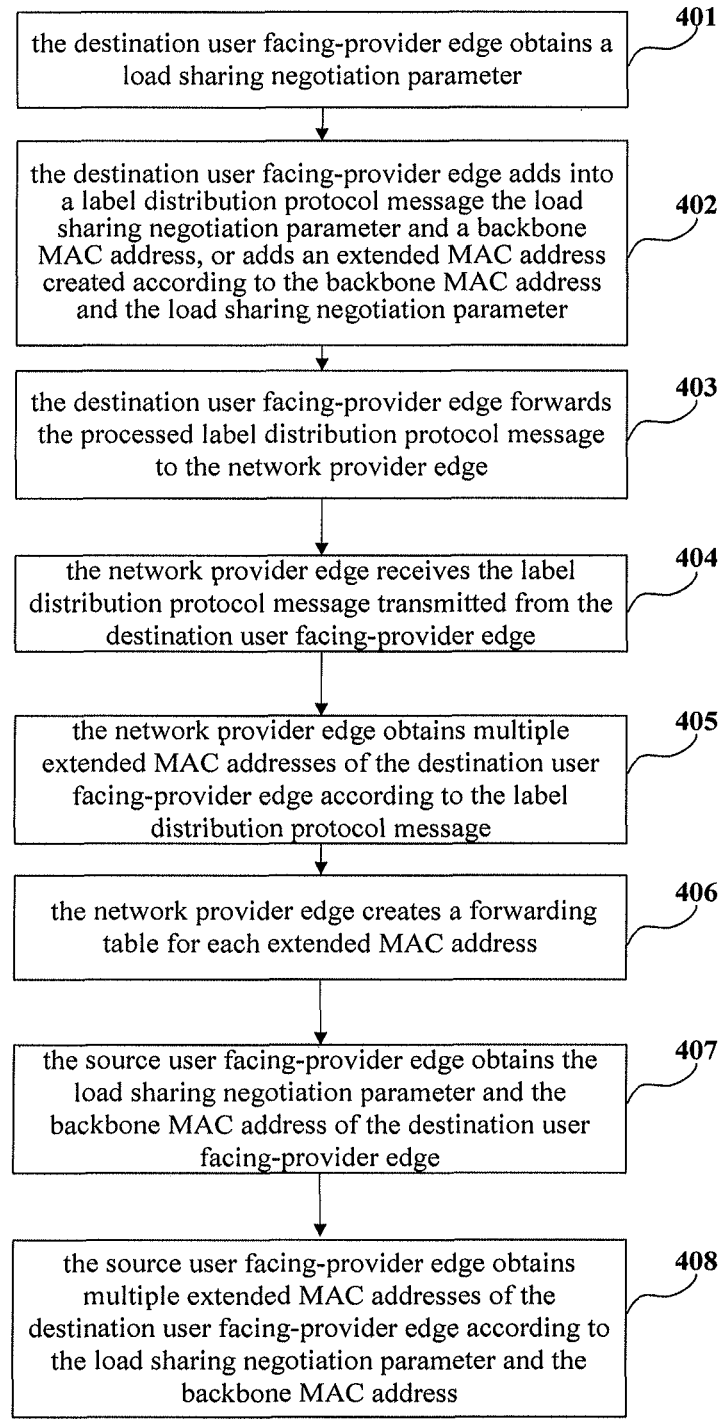
FIG. 4A is a flowchart illustrating the method for creating a forwarding table according to Embodiment 4 of the present invention.

As shown in FIG. 4A, the process of creating a forwarding table includes the following steps.

Step 401—the destination UPE obtains a load sharing negotiation parameter.

In one embodiment, the load sharing negotiation parameter can include the number of load sharing links in the PBB H-VPLS network, which number can be represented by ECMP NUM.

Preferably, the load sharing negotiation parameter can further include information identifying a flow direction of the message for judging whether to perform load sharing on subsequent data messages. The destination UPE can be configured as Passive, and the information identifying a flow direction of the message can be represented by A using bits; for instance, A being 1 indicates that the message is transmitted from Active, and A being 0 indicates that the message is transmitted from Passive. But not restricted thereto, the specific embodiment can be determined according to actual circumstances.

Step 402—the destination UPE adds into the LDP message the load sharing negotiation parameter and the backbone MAC address, or adds into the LDP message an extended MAC address created according to the backbone MAC address and the load sharing negotiation parameter.

In one embodiment, preferably, the destination UPE can add into the LDP message a type length value that includes the load sharing negotiation parameter and the backbone MAC address.

Figure 10:
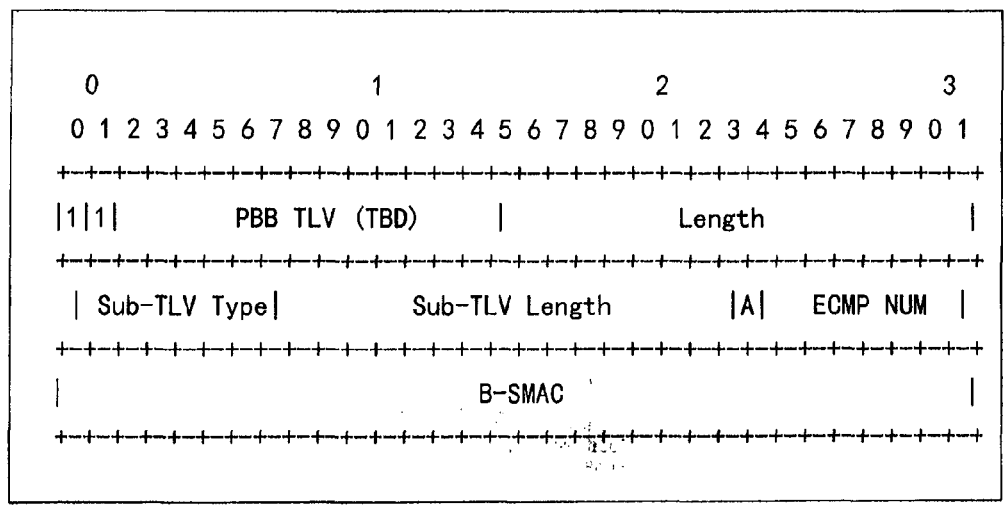
FIG. 10 is a schematic diagram illustrating type length values extended from PBB TLVs as defined in accordance with IETF.

FIG. 10 is a schematic diagram illustrating type length values extended from PBB TLVs as defined in accordance with IETF. As shown in FIG. 10, ECMP NUM represents the number of load sharing links in the PBB over H-VPLS network and can be represented using an integer value, A represents the information identifying a flow direction of the message, and B-SMAC can be the MAC address of the destination UPE.

For instance, ECMP NUM is 3, A is 0, and B-SMAC is 1-1-1. In order to avoid conflict among addresses in the network, it is still necessary to guarantee that consecutive three B-SMACs are not used by other devices or B-components. For instance, MAC addresses 1-1-2, 1-1-3 under a B-component are also reserved. But not restricted thereto, the specific embodiment can be determined according to actual circumstances.

The above is merely directed to an exemplary explanation to the type length value. But not restricted thereto, the specific embodiment can be determined according to actual circumstances.

In still another embodiment, the destination UPE can further create multiple extended MAC addresses according to the backbone MAC address and the load sharing negotiation parameter, and subsequently add in the LDP message the extended MAC addresses as created, thus, the LDP message includes multiple extended MAC addresses. Preferably, the destination UPE can add into the LDP message type length values including multiple extended MAC addresses.

Step 403—the destination UPE forwards the processed LDP message to the NPE.

The processed LDP message includes the load sharing negotiation parameter and the backbone MAC address, or includes an extended MAC address created according to the backbone MAC address and the load sharing negotiation parameter.

Step 404—the NPE receives the LDP message transmitted from the destination UPE.

In one embodiment, the LDP message carries the type length value including the load sharing negotiation parameter and the backbone MAC address of the destination UPE, and the load sharing negotiation parameter includes the number of load sharing links in the PBB over H-VPLS network.

Preferably, the load sharing negotiation parameter further includes information identifying a flow direction of the message. The flow direction of subsequent data messages can be unidirectional, and it might be desirable to perform load sharing in one direction only. It is possible to determine whether to perform load sharing according to the information identifying a flow direction of the message. For instance, if the identifying bit A is 0, this indicates that load sharing is performed on data messages received from Passive. But not restricted thereto, the specific embodiment can be determined according to actual circumstances.

Therefore, it is also possible for the NPE to determine whether to perform load sharing according to the information identifying a flow direction of the message. If it is determined to perform load sharing, Step 405 is executed.

Step 405—the NPE obtains multiple extended MAC addresses of the destination UPE according to the LDP message.

In one embodiment, preferably, the LDP message carries the type length value including the load sharing negotiation parameter and the backbone MAC address of the destination UPE, and the load sharing negotiation parameter includes the number of load sharing links in the PBB over H-VPLS network.

The NPE can obtain multiple extended MAC addresses of the destination UPE according to the backbone MAC address of the destination UPE and the number of load sharing links. For instance, if in the LDP message the ECMP NUM is 3 and B-SMAC is 1-1-1, then the NPE can create three consecutive extended MAC addresses 1-1-1, 1-1-2, and 1-1-3.

In another embodiment, the LDP message carries with multiple extended MAC addresses of the destination UPE created according to the backbone MAC address and the load sharing negotiation parameter. After receiving the LDP message, the NPE can directly obtain the above multiple extended MAC addresses. But not restricted thereto, as it is also possible to further extend the received extended MAC addresses. For instance, if the LDP message carries 1-1-1 and 1-1-4, then the NPE can obtain four extended MAC addresses 1-1-1, 1-1-2, 1-1-3, 1-1-4 according to the two MAC addresses, as the specific embodiment can be determined according to actual circumstances.

Step 406—the NPE creates a forwarding table, which includes an extended MAC address and multiple output ports to which the extended address corresponds, for each extended MAC address.

For instance, the NPE can create forwarding tables for the extended MAC addresses 1-1-1, 1-1-2, 1-1-3, respectively, and the forwarding information in the three forwarding tables can be the same. In addition, the NPE can also create output ports for each forwarding table according to the LDP message received from the destination UPE, and load sharing links are formed between the NPE and the destination UPE through multiple output ports. For instance, the number of the output ports can be three, which are port 1, port 2, and port 3 respectively.

After creating the forwarding tables, the NPE can forward the LDP message to other NPEs.

Step 407—the source UPE obtains the load sharing negotiation parameter and the backbone MAC address of the destination UPE, and the load sharing negotiation parameter includes the number of load sharing links in the PBB over H-VPLS network.

In one embodiment, the source UPE can obtain in advance the load sharing negotiation parameter and the backbone MAC address of the destination UPE. Specifically, these can be obtained through static configuration, and can also be obtained through dynamic learning from the NPE or the destination UPE.

Step 408—the source UPE obtains multiple extended MAC addresses of the destination UPE according to the load sharing negotiation parameter and the backbone MAC address of the destination UPE.

For instance, the source UPE can obtain multiple extended MAC addresses 1-1-1, 1-1-2, 1-1-3 of the destination UPE according to the load sharing negotiation parameter ECMP NUM=3 and the backbone MAC address 1-1-1 of the destination UPE. But not restricted thereto, the specific embodiment can be determined according to actual circumstances.

There is no sequential relationship between the foregoing Step 407 and Steps 401 to 406, or between Step 408 and Steps 401 to 406, as Steps 407 and 408 can be executed before Step 401 or simultaneously executed while Steps 401 to 406 are executed. The specific embodiment can be determined according to actual circumstances.

In one embodiment, the source UPE can store multiple extended MAC addresses of the destination UPE. The source UPE can also be configured as Active. But not restricted thereto, the specific embodiment can be determined according to actual circumstances.

By the aforementioned steps, the NPE can create forwarding tables to which the extended MAC addresses of the destination UPE correspond, and the number of forwarding tables is relatively less, whereas it is needed in the prior art to create a forwarding table for each service instance of subsequent data messages. There can be tens of thousands of service instances of data messages, i.e. there are great quantities of different I-tags, and it is needed in the NPE to create a forwarding table according to each of the different I-tags, so the forwarding tables as finally created are indeed of sea amount. Accordingly, embodiments of the present invention make it possible to greatly reduce the forwarding tables of the NPE and to lighten the pressure of the edging device.

Figure 4B:
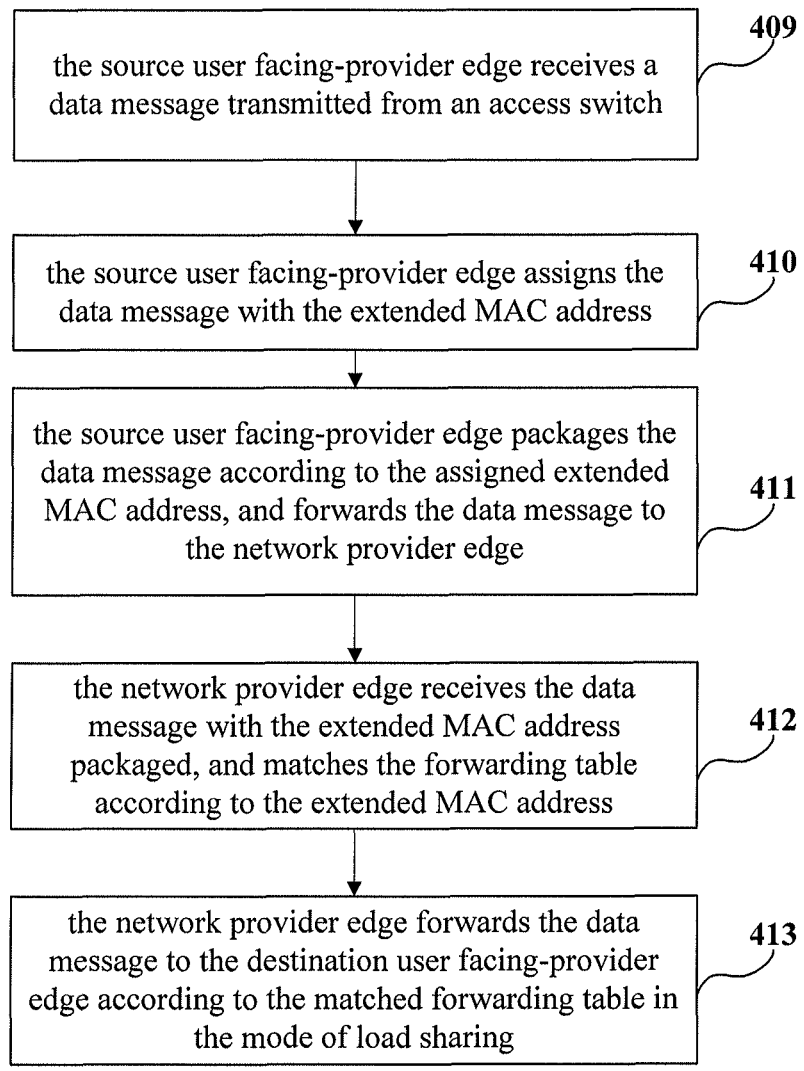
FIG. 4B is a flowchart illustrating the forwarding of a data message according to Embodiment 4 of the present invention.

On receiving the data message forwarded by the source UPE after creating the forwarding table, the NPE can forward the data message according to the created forwarding table. As shown in FIG. 4B, the process of forwarding the data message includes the following steps.

Step 409—the source UPE receives a data message transmitted from an access switch.

In one embodiment, preferably, the source UPE can pre-determine whether to perform load sharing. It is possible to determine whether to perform load sharing via pre-configuration. For instance, if the source UPE has already been configured as Active, indicating that the NPE has created the forwarding table according to the load sharing negotiation parameter, it can be determined to perform load sharing. If it is determined to perform load sharing, Step 410 is executed.

Step 410—the source UPE assigns the data message with the extended MAC address.

The source UPE divides the received data message into multiple groups based on the number of the extended MAC addresses, and assigns each group of data message with an extended MAC address, in which the extended MAC address of each group of data message is different from the MAC addresses of other groups.

Preferably, the source UPE assigns data messages with the same I-tags to the same group. When the number of I-tags is greater than the number of the extended MAC addresses, a group of data messages includes data messages carrying different I-tags.

Preferably, it is possible to divide data messages carrying different I-tags into groups by a Hash algorithm. Specifically, the source UPE can perform Hash calculation on the instance tags (I-tags) to which the data messages correspond, and determine the extended MAC addresses to which the data messages correspond according to the result of the Hash operation.

A data message can be marked by different instance tags (I-tags), and the source UPE can map the different I-tags to different extended MAC addresses via Hash calculation. For instance, in the case the I-tags are respectively 100, 101, 102 . . . 108, the source UPE can map I-tags 100, 103, 106 to 1-1-1, map I-tags 101, 104, 107 to 1-1-2, and map I-tags 102, 105, 108 to 1-1-3. Thus, if the I-tag of the received data message is 101, it can be determined that the extended MAC address to which the data message corresponds is 1-1-2.

Step 411—the source UPE packages the data message according to the extended MAC address to which the data message is assigned, and forwards the packaged data message to the NPE.

Step 412—the NPE receives the data message with the extended MAC address packaged, and matches the forwarding table according to the extended MAC address.

In one embodiment, the NPE can correspondingly match the forwarding tables created in Step 406 on a one-by-one basis according to the extended MAC addresses of the data message. But not restricted thereto, the specific embodiment can be determined according to actual circumstances.

For instance, after receiving the data message carrying 1-1-2, the NPE can match three forwarding tables created in Step 406 according to 1-1-2, and determine to forward the data message by the forwarding table corresponding to 1-1-2.

Step 413—the NPE forwards the data message to the destination UPE in the mode of load sharing according to the matched forwarding table.

Since the forwarding table in the NPE has multiple output ports, the NPE can forward the data message in the mode of load sharing. Preferably, the NPE can hash the extended MAC address of the data message to be forwarded, and determine from multiple output ports of the forwarding table one port as the output port of the data message with the extended MAC address packaged according to the hashing result. For instance, the NPE can hash the extended address 1-1-2 to determine the output port as port 2 according to the hashing result, and then the NPE forwards the data message with the extended MAC address as 1-1-2 through port 2.

Accordingly, since different extended MAC addresses are carried therewith, it is possible to select different load sharing paths while forwarding extended MAC addresses on the NPE, whereby the objective of load sharing is achieved.

By virtue of the aforementioned steps, while data messages are forwarded, it is possible to map great quantities of messages carrying different I-tags to few amount of extended MAC addresses of the destination UPE, and to further select different load sharing paths according to different extended MAC addresses. Thus, it is not only possible to reduce the forwarding tables of the network provider edge (NPE), but also to realize load sharing of the flow.

As can be known from the above embodiment, by adding via the destination UPE the load sharing negotiation parameter and the backbone MAC address into the LDP message, the NPE is enabled to create the forwarding tables according to the LDP message, whereby the forwarding tables of the NPE are greatly reduced and the pressure of the edging device is lightened. Moreover, the source UPE packages the extended MAC addresses according to the load sharing negotiation parameter, and the NPE matches the forwarding tables according to the extended MAC addresses, thus further realizing load sharing of the flow.

Embodiment 5

An embodiment of the present invention provides a network provider edge (NPE), applied in a PBB over H-VPLS network. The network includes a source UPE and a destination UPE, and there are load sharing links between the NPE and the destination UPE.

Figure 5:
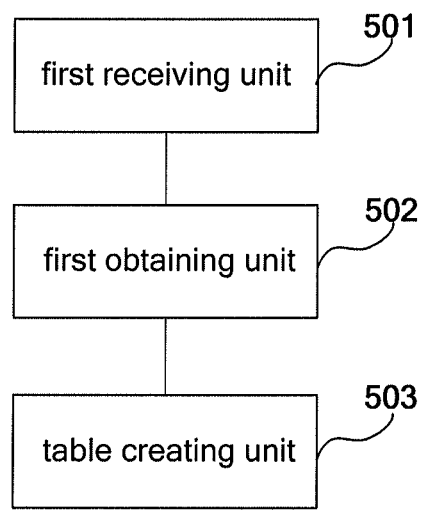
FIG. 5 is a diagram illustrating the constitution of the network provider edge according to Embodiment 5 of the present invention.

FIG. 5 is a schematic diagram illustrating the constitution of the NPE. As shown in FIG. 5, the NPE includes a first receiving unit 501, a first obtaining unit 502 and a table creating unit 503, of which the first receiving unit 501 is configured to receive an LDP message that carries a backbone MAC address of the destination UPE and a load sharing negotiation parameter between the destination UPE and the NPE or carries an extended MAC address created according to the backbone MAC address and the load sharing negotiation parameter;

the first obtaining unit 502 is configured to obtain multiple extended MAC addresses of the destination UPE according to the LDP message;

the table creating unit 503 is configured to create a forwarding table for each extended MAC address, and the forwarding table includes the extended MAC address and multiple corresponding output ports.

In one embodiment, the LDP message can be transmitted via the UPE in the PBB over H-VPLS network, and can also be forwarded via other UPEs.

Figure 6:
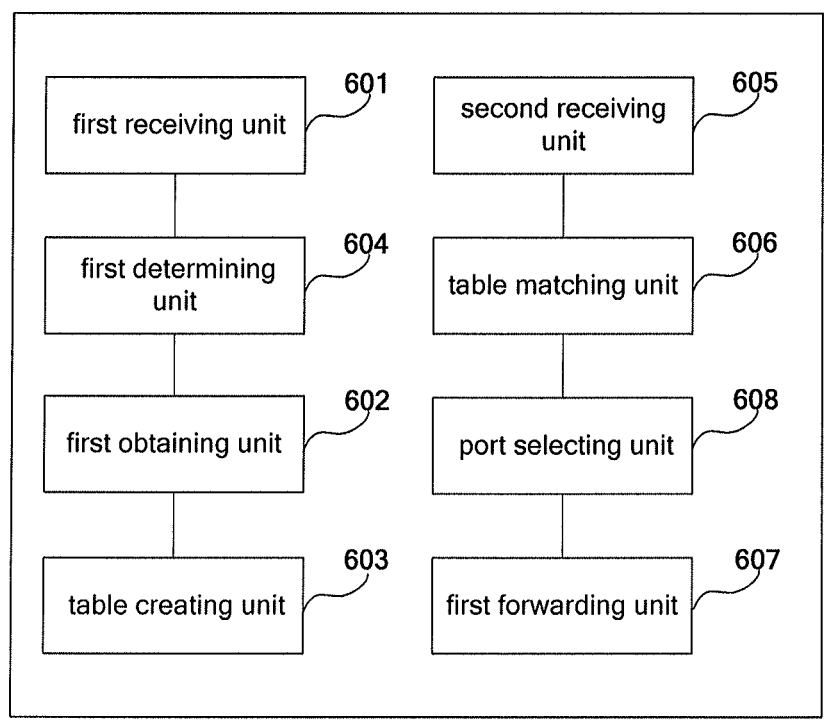
FIG. 6 is another diagram illustrating the constitution of the network provider edge according to Embodiment 5 of the present invention.

FIG. 6 is another schematic diagram; illustrating the constitution of the NPE, in which a first receiving unit 601, a first obtaining unit 602 and a table creating unit 603 are as described above, and no repetitive explanation is made herein.

In one embodiment, the load sharing negotiation parameter can include the number of load sharing links in the PBB over H-VPLS network, and the first obtaining unit 602 is specifically configured to create multiple extended MAC addresses of the destination UPE according to the backbone MAC address and the number of the load sharing links.

Preferably, the load sharing negotiation parameter can further include information identifying a flow direction of the message. As shown in FIG. 6, the NPE can further include a first determining unit 604 configured to determine whether to perform load sharing according to the information identifying a flow direction of the message; moreover, the first obtaining unit 602 obtains multiple extended MAC addresses of the destination UPE according to the LDP message when the first determining unit 604 determines to perform load sharing.

In one embodiment, the NPE can further include a second receiving unit 605, a table matching unit 606 and a first forwarding unit 607, of which the second receiving unit 605 is configured to receive a data message forwarded by the source UPE, and the data message carries an extended MAC address;

the table matching unit 606 is configured to match the forwarding table according to the extended MAC address;

the first forwarding unit 607 is configured to forward the data message according to the matched forwarding table.

Moreover, the NPE can further include a port selecting unit 608 configured to select an output port for forwarding the data message according to the extended MAC address; the first forwarding unit 607 is specifically configured to forward the data message at the selected output port.

The various component parts of the device according to this embodiment are respectively configured to realize the various steps of the methods according to the foregoing embodiments. Since the various steps have been described in detail in the foregoing embodiments of methods, no repetitive explanation to the various component parts is made in this context.

As can be known from the above embodiment, the NPE creates the forwarding table according to the extended MAC addresses, while the number of the extended MAC addresses is determined according to the number of load sharing links between the NPE and the destination UPE. Thus, in comparison with the number of I-tags of the data message, the number of the extended MAC addresses is by far less. Since it is not necessary for the NPE to create a corresponding number of forwarding tables in accordance with the number of I-tags, the number of forwarding tables in the NPE can be greatly reduced, and the pressure of the device is lightened.

Embodiment 6

An embodiment of the present invention provides a destination user facing-provider edge (UPE), applied in a PBB over H-VPLS network. The network further includes a source UPE and an NPE, and there are load sharing links between the NPE and the destination UPE.

Figure 7:
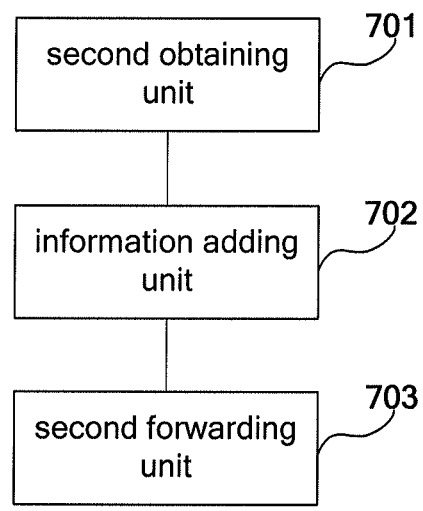
FIG. 7 is a diagram illustrating the constitution of the destination user facing-provider edge according to Embodiment 6 of the present invention.

FIG. 7 is a schematic diagram illustrating the constitution of the destination UPE. As shown in FIG. 7, the destination UPE includes a second obtaining unit 701, an information adding unit 702 and a second forwarding unit 703, of which the second obtaining unit 701 is configured to obtain a load sharing negotiation parameter;

the information adding unit 702 is configured to add into an LDP message a backbone MAC address that includes the load sharing negotiation parameter and the destination UPE, or add into the LDP message an extended MAC address created according to the backbone MAC address and the load sharing negotiation parameter;

the second forwarding unit 703 is configured to forward the processed LDP message.

In one embodiment, the load sharing negotiation parameter can include the number of load sharing links in the PBB over H-VPLS network. Preferably, the load sharing negotiation parameter can include the number of load sharing links in the PBB over H-VPLS network and information identifying a flow direction of the message.

The various component parts of the device according to this embodiment are respectively configured to realize the various steps of the methods according to the foregoing embodiments. Since the various steps have been described in detail in the foregoing embodiments of methods, no repetitive explanation to the various component parts is made in this context.

As can be known from the above embodiment, by adding the load sharing negotiation parameter and the backbone MAC address into the LDP message or adding the extended MAC addresses created according to the backbone MAC address and the load sharing negotiation parameter into the LDP message through the destination UPE, it is made possible for the NPE to create the forwarding table according to the LDP message, whereby the forwarding tables of the NPE are greatly reduced, and the pressure of the device is lightened.

Embodiment 7

An embodiment of the present invention provides a source user facing-provider edge (UPE), applied in a PBB over H-VPLS network. The network further includes an NPE and a destination UPE, and there are load sharing links between the NPE and the destination UPE.

Figure 8:
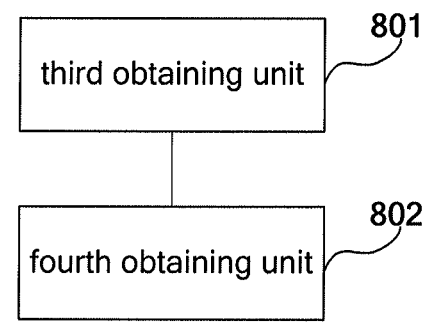
FIG. 8 is a diagram illustrating the constitution of the source user facing-provider edge according to Embodiment 7 of the present invention.

FIG. 8 is a schematic diagram illustrating the constitution of the source UPE. As shown in FIG. 8, the source UPE includes a third obtaining unit 801 and a fourth obtaining unit 802, of which the third obtaining unit 801 is configured to obtain a load sharing negotiation parameter and a backbone MAC address of the destination UPE, and the load sharing negotiation parameter includes the number of load sharing links in the PBB over H-VPLS network;

the fourth obtaining unit 802 is configured to obtain multiple extended MAC addresses of the destination UPE according to the load sharing negotiation parameter and the backbone MAC address of the destination UPE.

Figure 9:
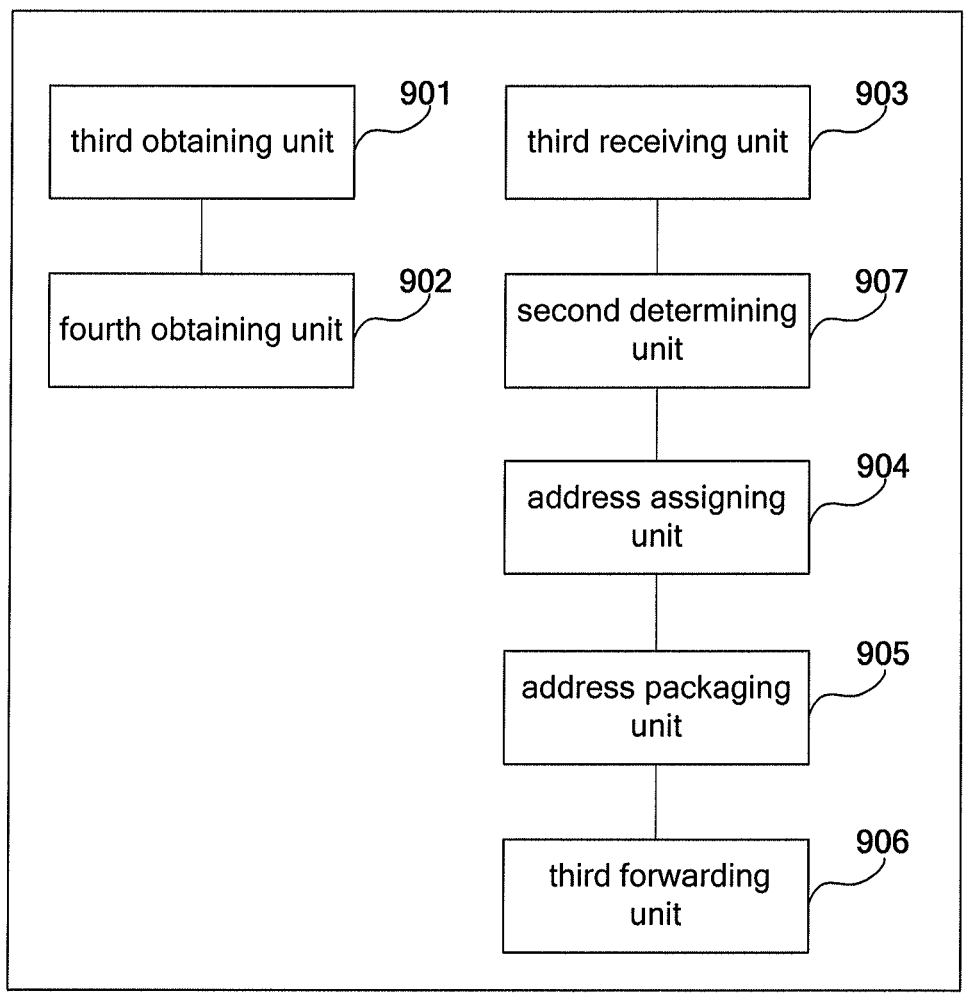
FIG. 9 is another diagram illustrating the constitution of the source user facing-provider edge according to Embodiment 7 of the present invention.

FIG. 9 is another schematic diagram illustrating the constitution of the source UPE. As shown in FIG. 9, the source UPE includes a third obtaining unit 901 and a fourth obtaining unit 902. These are as described above, and no repetitive explanation is made thereto in this context.

In one embodiment, the source UPE can further include a third receiving unit 903, an address assigning unit 904, an address packaging unit 905, and a third forwarding unit 906, of which the third receiving unit 903 is configured to receive a data message transmitted from an access switch;

the address assigning unit 904 is configured to assign the data message with an extended MAC address according to multiple extended MAC addresses of the destination UPE;

the address packing unit 905 is configured to package the data message according to the assigned extended MAC address;

the third forwarding unit 906 is configured to forward the processed data message.

Moreover, the address assigning unit 904 can divide the received data message into multiple groups based on the number of the extended MAC addresses, and assign each group of data message with an extended MAC address, in which the extended MAC address of each group of data message is different from the MAC addresses of other groups.

Furthermore, the source UPE can further include a second determining unit 907 configured to determine whether to perform load sharing on the data message, and the address assigning unit 904 assigns the data message with an extended MAC address according to multiple extended MAC addresses of the destination UPE when the second determining unit 907 determines to perform load sharing.

The various component parts of the device according to this embodiment are respectively configured to realize the various steps of the methods according to the foregoing embodiments. Since the various steps have been described in detail in the foregoing method embodiments, no repetitive explanation to the various component parts is made in this context.

As can be known from the above embodiment, the source UPE creates the extended MAC addresses of the destination UPE, and takes the extended MAC addresses as the destination addresses of the data messages. Thus, it suffices for the NPE to merely maintain the forwarding tables to which the extended MAC addresses correspond. Since the number of the extended MAC addresses is relatively few, the forwarding tables of the NPE are greatly reduced, and the pressure of the device is lightened. Moreover, the source UPE packages the extended MAC addresses according to the load sharing negotiation parameter, and the NPE matches the forwarding tables according to the extended MAC addresses, thus further realizing load sharing of the flow.

As can be further aware to persons skilled in the art, the various exemplary units and algorithmic steps described with reference to the embodiments herein disclosed can be realized by electronic hardware, by computer software, or by a combination of the two. In order to clearly explain the interchangeability of hardware and software, configurations and steps of the various exemplary embodiments have been generally described as above according to functionalities. Whether these functionalities are executed in the form of hardware or software depends upon restricting conditions of specific applications of and designs for the technical solutions. Persons skilled in the art can employ different methods to realize the described functionalities with respect to each specific application, but such realization shall not be regarded as going beyond the scope of the present invention.

The steps of the methods or algorithms described with reference to the embodiments herein disclosed can be implemented by hardware, by software modules executed via a processor, or by a combination of the two. The software modules can be placed in a random access memory (RAM), a memory, a read-only memory (ROM), an electronically programmable ROM, an electronically erasable programmable ROM, a register, a hard disc, a removable magnetic disc, a CD-ROM, or a storage medium of any other form publicly known in the art.

The specific embodiments as described above have explained in detail the objectives, technical solutions and advantageous effects of the present invention. As should be understood, the above is merely directed to specific embodiments of the present invention, and is not meant to define the protection scope of the present invention, as any modification, equivalent substitution and improvement makeable within the spirits and principles of the present invention shall all be covered within the protection scope of the present invention.

The invention claimed is:

1. A method for creating a forwarding table, applied in a provider backbone bridge (PBB) over hierarchical virtual private local area network services (H-VPLS) network comprising a source user facing-provider edge (UPE), a network provider edge (NPE) and a destination user facing-provider edge (UPE), load sharing links being between the NPE and the destination UPE, wherein the method comprises:
    receiving, by the NPE, a label distribution protocol (LDP) message, the LDP message carrying a backbone MAC address of the destination UPE and a load sharing negotiation parameter between the destination UPE and the NPE or the LDP message carrying an extended MAC address created according to the backbone MAC address and the load sharing negotiation parameter;
    obtaining, by the NPE, a plurality of extended MAC addresses of the destination UPE according to the LDP message; and
    creating a forwarding table for each extended MAC address, the forwarding table comprising the extended MAC address and a plurality of corresponding output ports.

2. The method for creating a forwarding table according to claim 1, wherein the load sharing negotiation parameter comprises the number of the load sharing links in the PBB over H-VPLS network; wherein the NPE obtaining a plurality of extended MAC addresses of the destination UPE according to the LDP message specifically comprises:
    creating the plurality of extended MAC addresses of the destination UPE according to the backbone MAC address and the number of the load sharing links.

3. The method for creating a forwarding table according to claim 2, wherein the load sharing negotiation parameter further comprises information identifying a flow direction of the message; wherein the method further comprises, prior to the NPE obtaining a plurality of extended MAC addresses of the destination UPE according to the LDP message:
    determining whether to perform load sharing according to the Information identifying a flow direction of the message; and
    obtaining, by the NPE, the plurality of extended MAC addresses of the destination UPE according to the LDP message when it is determined to perform the load sharing.

4. The method for creating a forwarding table according to any one of claims 1 to 3, the method further comprising, subsequent to creating a forwarding table for each extended MAC address:
    receiving, by the NPE, a data message forwarded by the source UPE, the data message carrying an extended MAC address;
    matching the forwarding table according to the extended MAC address;
    forwarding the data message according to the matched forwarding table.

5. The method for creating a forwarding table according to claim 4, wherein the data message is forwarded by the source UPE after the data message being assigned by the source UPE with a corresponding extended MAC address according to the plurality of extended MAC address of the destination UPE and being encapsulated according to the assigned extended MAC address.

6. The method for creating a forwarding table according to claim 4, wherein forwarding the data message according to the matched forwarding table specifically comprises:
    selecting an output port for forwarding the data message according to the extended MAC address; and
    forwarding the data message at the selected output port.

7. A method for forwarding a message, applied in a provider backbone bridge (PBB) over hierarchical virtual private local area network services (H-VPLS) network comprising a source user facing-provider edge (UPE), a network provider edge (NPE) and a destination user facing-provider edge (UPE), load sharing links being between the NPE and the destination UPE, wherein the method comprises:
    obtaining, by the destination UPE, a load sharing negotiation parameter;
    adding into a label distribution protocol (LDP) message the load sharing negotiation parameter and a backbone MAC address of the destination UPE; or adding into the LDP message an extended MAC address created according to the backbone MAC address and the load sharing negotiation parameter; and
    forwarding the processed label distribution protocol message.

8. The method for forwarding a message according to claim 7, wherein the load sharing negotiation parameter comprises the number of the load sharing links in the PBB over H-VPLS network, or
    the load sharing negotiation parameter comprises the number of the load sharing links in the PBB over H-VPLS network and information identifying a flow direction of the message.

9. A method for obtaining an address, applied in a provider backbone bridge (PBB) over hierarchical virtual private local area network services (H-VPLS) network comprising a source user facing-provider edge (UPE), a network provider edge (NPE) and a destination user facing-provider edge (UPE), load sharing links being between the NPE and the destination UPE, wherein the method comprises:
    obtaining, by the source UPE, a load sharing negotiation parameter and a backbone MAC address of the destination UPE, the load sharing negotiation parameter comprising the number of the load sharing links in the PBB over H-VPLS network; and
    obtaining, by the source UPE, a plurality of extended MAC addresses of the destination UPE according to the load sharing negotiation parameter and the backbone MAC address of the destination UPE.

10. The method for obtaining an address according to claim 9, the method comprising, after the source UPE receiving a data message transmitted from an access switch:
    assigning, by the source UPE, the data message with an extended MAC address according to the plurality of extended MAC addresses of the destination UPE;
    encapsulating the data message according to the extended MAC address assigned to the data message; and
    forwarding the processed data message.

11. The method for obtaining an address according to claim 10, wherein assigning, by the source UPE, the data message with an extended MAC address according to the plurality of extended MAC addresses of the destination UPE comprises:
    dividing, by the source UPE, the received data message into a plurality of groups based on the number of the extended MAC addresses, and assigning each group of data message with an extended MAC address, wherein the extended MAC address of each group of data message is different from the MAC addresses of other groups.

12. A network provider edge (NPE), applied in a provider backbone bridge (PBB) over hierarchical virtual private local area network services (H-VPLS) network, the network further comprising a source user facing-provider edge (UPE) and a destination user facing-provider edge (UPE), load sharing links being between the NPE and the destination UPE, wherein the network provider edge (NPE) comprises a processor coupled with a nontransitory storage, the processor configured to:
receive a label distribution protocol (LDP) message, the LDP message carrying a backbone media access control (MAC) address of the destination UPE and a load sharing negotiation parameter between the destination UPE and the NPE or the LDP message carrying an extended MAC address created according to the backbone MAC address and the load sharing negotiation parameter;
obtain a plurality of extended MAC addresses of the destination UPE according to the LDP message; and
create a forwarding table for each extended MAC address, the forwarding table comprising the extended MAC address and a plurality of corresponding output ports.

13. The network provider edge (NPE) according to claim 12, wherein the load sharing negotiation parameter comprises the number of the load sharing links in the PBB over H-VPLS network; wherein
the processor is configured to create a plurality of extended MAC addresses of the destination UPE according to the backbone MAC address and the number of the load sharing links.

14. The network provider edge (NPE) according to claim 13, wherein the load sharing negotiation parameter further comprises information identifying a flow direction of the message; wherein the processor is further configured to determine whether to perform load sharing according to the information identifying a flow direction of the message; and
to obtain the plurality of extended MAC addresses of the destination UPE according to the LDP message when the processor determines to perform the load sharing.

15. The network provider edge (NPE) according to any one of claims 12 to 14, the processor is further configured to:
receive a data message forwarded by the source UPE, wherein the data message carrying an extended MAC address;
match the forwarding table according to the extended MAC address; and
forward the data message according to the matched forwarding table.

16. The network provider edge (NPE) according to claim 15, wherein the data message is forwarded by the source UPE after the data message is assigned by the source UPE with a corresponding extended MAC address according to the plurality of extended MAC address of the destination UPE and is encapsulated according to the assigned extended MAC address.

17. The network provider edge (NPE) according to claim 15, wherein the processor is further configured to:
select an output port for forwarding the data message according to the extended MAC address; wherein
forward the data message at the selected output port.

18. A destination user facing-provider edge (UPE), applied in a provider backbone bridge (PBB) over hierarchical virtual private local area network services (H-VPLS) network, the network further comprising a source user facing-provider edge (UPE) and a network provider edge (NPE), load sharing links being between the NPE and the destination UPE, wherein the destination UPE comprises a processor coupled with a nontransitory storage, the processor configured to:
obtain a load sharing negotiation parameter;
add into a label distribution protocol (LDP) message the load sharing negotiation parameter and a backbone MAC address of the destination UPE, or add into the LDP message an extended MAC address created according to the backbone MAC address and the load sharing negotiation parameter; and
forward the processed label distribution protocol message.

19. The destination user facing-provider edge (UPE) according to claim 18, wherein the load sharing negotiation parameter comprises the number of the load sharing links in the PBB over H-VPLS network, or that
the load sharing negotiation parameter comprises the number of the load sharing links in the PBB over H-VPLS network and information identifying a flow direction of the message.

20. A source user facing-provider edge (UPE), applied in a provider backbone bridge (PBB) over hierarchical virtual private local area network services (H-VPLS) network, the network further comprising a network provider edge (NPE) and a destination user facing-provider edge (UPE), load sharing links being between the NPE and the destination UPE, wherein the source UPE comprises a processor coupled with a storage, the processor is configured to:
obtain a load sharing negotiation parameter and a backbone MAC address of the destination UPE, the load sharing negotiation parameter comprising the number of the load sharing links in the PBB over H-VPLS network; and
obtain a plurality of extended MAC addresses of the destination UPE according to the load sharing negotiation parameter and the backbone MAC address of the destination UPE.

21. The source user facing-provider edge (UPE) according to claim 20, the processor is further configured to:
receive a data message transmitted from an access switch;
further configured to assign the data message with an extended MAC address according to the plurality of extended MAC addresses of the destination UPE; and
encapsulate the data message according to the assigned extended MAC address; and
forward the processed data message.

22. The source user facing-provider edge (UPE) according to claim 21, wherein the processor is configured to divide the received data message into a plurality of groups based on the number of the extended MAC addresses, and assign each group of data message with an extended MAC address, wherein the extended MAC address of each group of data message is different from the MAC addresses of other groups.

* * * * *